Feb. 20, 1968 TSUTOMU KOMODA 3,370,168

ANODE APERTURE PLATE FOR A TELEVISION CAMERA TUBE IN AN ELECTRON MICROSCOPE COMPRISING A STAINLESS STEEL FOIL

Filed Dec. 31, 1964

INVENTOR.
Tsutomu Komoda

BY

H. Edward Mestern

United States Patent Office 3,370,168

Patented Feb. 20, 1968

3,370,168

ANODE APERTURE PLATE FOR A TELEVISION CAMERA TUBE IN AN ELECTRON MICROSCOPE COMPRISING A STAINLESS STEEL FOIL

Tsutomu Komoda, Tokyo-to, Japan, assignor to Kabushiki Kaisha Hitachi Seisakusho, Tokyo-to, Japan, a joint-stock company of Japan Filed Dec. 31, 1964, Ser. No. 422,828
Claims priority, application Japan, Jan. 14, 1964, 39/1829
1 Claim. (Cl. 250—49.5)

ABSTRACT OF THE DISCLOSURE

A television camera tube for installation in electron microscopes utilizing a scanning electron gun provided with an anode aperture plate made of a stainless steel whose aperture part is heated by bombardment of the scanning electron beam itself.

This invention relates to electron microscopes and television camera tubes and more particularly to television camera tubes for built-in installation in electron microscopes.

A general object of the invention is to provide improvements in the television camera tubes provided with electron-bombardment induced-conductivity films and adapted for installation in electron microscopes.

More specifically, it is an object of the invention to prevent contamination of the anode aperture of scanning electron guns used in apparatuses with which the invention is concerned as will be more fully described hereinafter.

According to the present invention there is further provided, in a television camera tube of the above stated character, a scanning electron gun provided with an anode aperture plate made of stainless steel and having an aperture part which is heated by bombardment by the scaning electron beam itself.

The nature, principle, and details of the invention will be more clearly apparent from the following description taken in conjunction with the accompanying drawings in which like parts are designated by like reference characters, and in which:

FIGURE 4 is a similar view showing the essential parts of another embodiment of the invention.

As is known, an insulating thin film of substances such as amorphous selenium, $SiO_2$, and other oxides have, in general, the property whereby when each film is bombarded by a high-speed electron beam accelerated by high voltage of the order of from 20 to 100 kilovolts, a conduction current flows therethrough which is from several tens to several thousands of times the bombarding current, this property being known as the so-called electron-bombardment, induced conductivity (hereinafter referred to simply as "induced conductivity").

Figure 1:
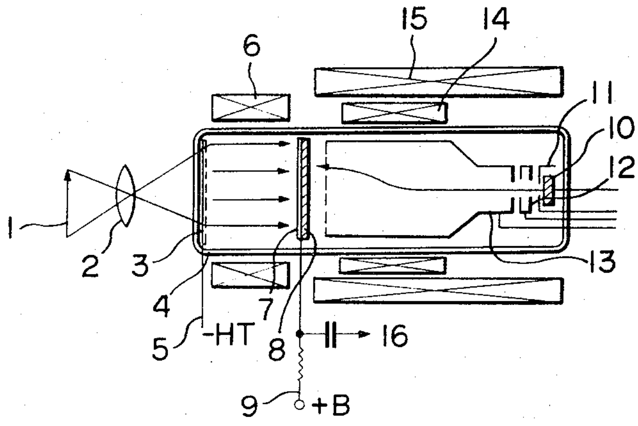
FIGURE 1 is a simplified diagram, in longitudinal section, showing a television camera tube provided with an electron-bombardment induced-conductivity film.

One example of a television camera tube provided with such an induced-conductivity film is illustrated in FIGURE 1. In the operation of this tube, the optical image of an object 1 is first projected by an optical lens system 2 onto a photocathode 4, whereupon corresponding photoelectrons are emitted from the photocathode 4. These photoelectrons are accelerated by a voltage of some tens of kilovolts impressed across a confronting electrode 7 and a transparent electrode 3 comprising principally a nesa film supplying power to the photocathode 4 and, as they are focused by a focusing coil 6, bombard at high speed the anticathode 7. This anticathode 7 is generally made of a thin metal foil, and on its rear surface (surface away from the photocathode 4), there is deposited by evaporation deposition a thin film 8 of a substance producing the aforementioned induced conductivity. Accordingly, the above mentioned high-speed photoelectrons are transmitted through the anticathode 7 and bombard the induced-conductivity film 8 to impart thereto the induced-conductivity effect.

Therefore, by scanning this induced-conductivity film 8 with a low-velocity scanning electron beam from an electron gun comprising a cathode 10, a Wehnelt electrode 11, accelerating electrodes 12 and 13, a deflection coil 14, a focusing coil 15, and other parts, thereby to charge this film 8 to the same potential as the cathode 10, only those parts of this film 8 which are bombarded by the high-speed electron beam are caused to discharge because of the induced-conductivity effect. Consequently, a distribution pattern of positive charges corresponding to the external optical image is produced on the induced-conductivity film 8. When this pattern is again scanned by the above mentioned scanning electron beam, a charging current of a value to neutralize the positive charges, that is, of a value corresponding to the above said discharge current, flows from the electrode 7 through path 9, whereby a signal output is obtained at terminal 16.

Figure 2:
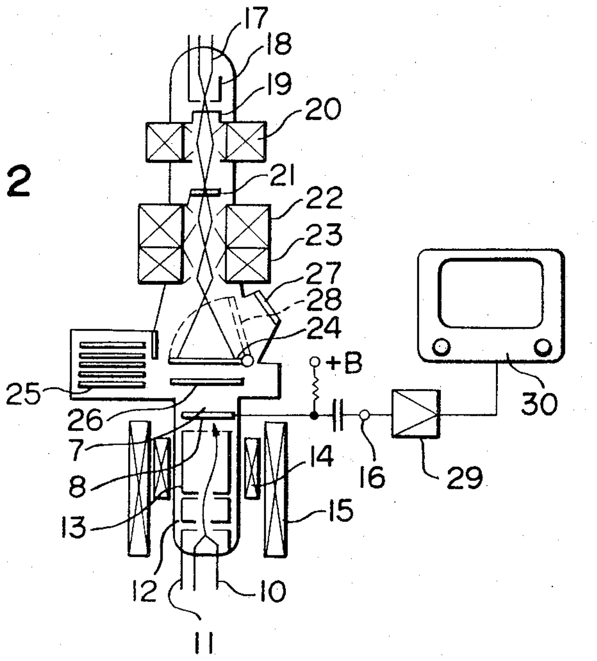
FIGURE 2 is a simplified arrangement diagram, in longitudinal section, showing an electron microscope in which the television camera tube shown in FIGURE 1 is internally installed.

By installing a television camera tube of the above description within an electron microscope, for example, as shown in FIGURE 2, so as to cause imaging electrons for forming the electron microscope image to bombard directly the aforementioned induced-conductivity film, and by scanning the film from the rear with a low-speed scanning electron beam, it is possible to reproduce a clear electron microscope image on the screen of a television receiver in accordance with the resulting signal output.

The electron microscope shown in FIGURE 2 comprises a filament 17 for emitting an electron beam from one end (upper end as viewed in FIGURE 2) of the microscope, a Wehnelt cylinder, an anode 19, a focusing lens 20, magnifying lenses 22 and 23, and a fluorescent plate 24, these parts being arranged as shown. A specimen 21 to be examined is disposed in the electron beam path between the focusing lens 20 and the magnifying lens 22, and a photographic dry plate 26 is disposed below the fluorescent plate 24. Other dry plates 25 are stored at one side.

When this electron microscope is in the state for ordinary use, the image of the specimen is formed on the fluorescent plate 24 to be observed through a viewing window 27. For photograhpic recording, the fluorescent plate 24 is moved to a position 28 as indicated by dotted line, thereby to permit the dry plate 27 to be exposed directly to the imaging electrons.

Below the above described electron microscope parts, there is further installed the aforedescribed television camera tube, that is, the camera tube shown in FIGURE 1 after removal of the optical image projecting section to the left of the counter-electrode 7 (as viewed in FIGURE 1) and the parts for projecting the imaging electrons. Accordingly, the construction of this camera tube installed in the microscope shown in FIGURE 2 is exactly the same as that shown in FIGURE 1 from, and including, the anticathode to the right. The camera tube is so disposed in the electron microscope shown in FIGURE 2 that imaging electrons from the microscope above can be transmitted directly through a signal lead-out electrode (the aforesaid anticathode) 7 and bombard the induced-conductivity film 8, thereby to impart the aforementioned induced-conductivity effect.

Accordingly, when the fluorescent plate 24 is moved to the position 28, the dry plate is removed from the electron beam path, and the imaging electrons from the microscope are projected onto the induced-conductivity film 8, a positive charge distribution pattern is produced as described hereinabove on the film 8 in correspondence to the electron microscope image. Then, in accordance with the scanning of the scanning electron beam, a signal output is produced at the output 16. By amplifying this signal in an amplifier 29 and introducing the amplified signal into a television receiver 30 in which the phosphor screen of its cathode-ray tube is scanned in synchronism with the above mentioned scanning, a clear reproduction of the electron microscope image can be produced on the phosphor screen.

In a device such as a television device for an electron microscope adapted to reproduce the electron microscope image as a television image of even higher clarity through the use of an electron-bombardment induced-conductivity target which changes its conductivity in response to bombardment by electrons from an object to be imaged as described above and such as a test device of a photo conductive target for an ordinary television camera tube, the camera tube part thereof is ordinarily in communication with parts such as a constantly operating evacuation system and vacuum pump. For this reason, polymers of organic gases (principally oils and fats) which are called "contamination" accumulate at places which are subjected to electron bombardment by electrons such as those of the scanning beams.

Particularly in the case of the anode aperture of a scanning electron beam, obstruction due to adhesion of contamination is very great because the anode aperture is constantly subjected to electron bombardment of the order from 0.1 to 1.0 mA., and, moreover, the aperture hole of a diameter of approximately 50 microns or less is formed with high precision. For example, 50 hours of use generally causes the diameter of an aperture hole to be reduced by contamination deposition to approximately ½ the original diameter, whereby the quantity of electron beam scanning the target surface is greatly reduced. As a result, the operation unavoidably becomes defective as that of a camera tube.

In view of this difficulty, the present invention contemplates the provision of a new television camera tube which is suitable for the above described application, and which is so arranged and constructed as to make possible positive heating of the anode aperture hole part of the scanning electron gun, thereby to prevent deposition of the so-called contamination onto said hole part.

It has been found that, ordinarily, by heating such parts to a temperature of approximately 250 degrees C. or higher, deposition is reduced to approximately ½ of that in the case of room temperature. In actual practice, therefore, it is preferable to heat to a temperature above 100 degrees C. the parts on which contamination deposition is to be prevented.

In order to indicate more fully the specific nature of the present invention, the following description with respect to two preferred embodiments thereof are presented.

Figure 3:
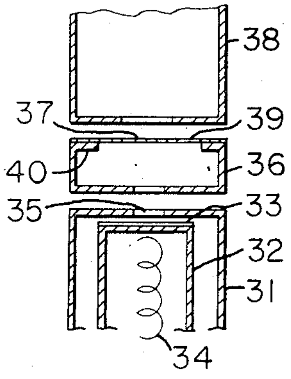
FIGURE 3 is a simplified sectional view showing the essential parts of one embodiment of the invention.

Referring to FIGURE 3 showing the scanning electron gun part in a television camera tube according to the invention, there is provided a cathode 32 at ground potential shielded by a cathode shield 31 at a negative potential relative to the cathode 32. The cathode 32 is provided therein with a heater 34 and immediately downstream thereof with a cathode emitter 33 (for example, an oxide cathode). The cathode shield 31 has an aperture 35. Downstream from the aperture 35, there is provided a first anode 36 which is at a positive potential of a number of hundreds of volts relative to cathode 32 and has an anode aperture 37 of a diameter of approximately 50 microns. Further downstream, there is provided a second anode 38 at a potential is approximately the same as that of the first anode 36. The above described parts of the scanning electron gun are of the same general arrangement as the equivalent part of a conventional camera tube of the invention in the embodiment thereof shown in FIGURE 3, however, differs in that an anode aperture plate 39, made of stainless steel, is provided. More specifically, this plate 39 has an aperture part which is heated by bombardment of the scanning electron beam itself. The quantity of electrons passing through the aperture hole 37 of the aperture plate 39 and reaching the target (not shown) is 1 percent or less of the total quantity of electrons emitted.

Since the energy supply rate of the electrons bombarding the aperture plate 41 is generally low, being of the order of 0.1 watt almost no temperature rise is obtained with the use of sheets or foils of metals such as nickel which are conventionally used, whereby the intended effect cannot be obtained. Therefore, for the aperture plate 39 in the example arrangement shown in FIGURE 3, a metal material such as stainless steel of relatively low thermal conductivity is used, and its thickness is made thin, whereby the aperture hole part can be amply heated to a temperature of 250 degrees C. or higher.

As one example, by welding a piece of stainless steel foil of 10 micron thickness onto an anode frame 40 having an opening of a diameter of 4 to 5 mm. for a bombardment electron energy of 0.1 watt, the desired heating is fully achieved. Furthermore, even if stainless steel is not used, for example, by forming the aperture plate 39 in a long and narrow rectangular form instead of a disk and, moreover, making its thickness amply thin, it is possible to reduce substantially the energy loss due to heat conduction to the surroundings, whereby an equivalent effect can be obtained.

According to the invention as described above, the problem caused by deposition of contamination at the anode aperture can be solved in a very simple manner. Accordingly, no deficiency whatsoever in the scanning electron current occurs, and, in addition, it is possible to prevent fully defective operation such as deflection of the direction of scanning beam due to charging by the electrons of deposited contamination on the aperture part of the anode and disturbance of focus of the beam on the target surface caused by astigmatism due to abnormal electric field.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claim.

What I claim is:

1. In an electron microscope comprising means to project an electron beam toward a specimen, a target consisting of an anticathode and a conductive layer formed on the reverse surface of the anticathode and caused by electron bombardment to exhibit induced-cathode-conductive effect, a lens for projecting electrons from the specimen onto the front surface of the anticathode, a scanning electron gun for emitting a scanning electron beam, means for scanning of the reverse surface of the conductive layer by the scanning electron beam, means to lead out from the target an electrical signal corresponding to an electrical charge pattern of the specimen produced on the target by said scanning outside the electron microscope, and a television receiver for reproducing in accordance with said electrical signal the electron microscope image of the specimen, the scanning electron gun constituting a television camera tube being provided with an anode aperture plate made of stainless steel foil whose aperture part is heated by bombardment of the scanning electron beam itself.

References Cited

UNITED STATES PATENTS

| | | | |
|---|---|---|---|
| 2,271,990 | 2/1942 | Ramberg et al. | 250—49.5 |
| 2,894,160 | 7/1959 | Sheldon | 250—49.5 |
| 3,051,860 | 8/1962 | Haine et al. | 250—49.5 |

RALPH G. NILSON, *Primary Examiner.*

A. L. BIRCH, *Assistant Examiner.*